United States Patent [19]
Lancaster

[11] Patent Number: 5,626,293
[45] Date of Patent: May 6, 1997

[54] NOZZLE CONTROL FOR SPRAY HEAD ASSEMBLY

[76] Inventor: S. Spear Lancaster, 1188 Bacon Ridge Rd., Crownsville, Md. 21132

[21] Appl. No.: 443,778

[22] Filed: May 18, 1995

[51] Int. Cl.⁶ ................................................ B05B 1/30
[52] U.S. Cl. ................................... 239/530; 239/583
[58] Field of Search .................... 239/525, 530, 239/586, 580, 579, 588; 251/251, 263, 241, 333, 359

[56] References Cited

U.S. PATENT DOCUMENTS

| | | | |
|---|---|---|---|
| 980,224 | 1/1911 | Eiden | 251/241 X |
| 1,463,800 | 8/1923 | Coonan | 251/241 X |
| 1,567,711 | 12/1925 | Chase | 251/241 |
| 3,006,560 | 10/1961 | Rosenkranz | 239/583 X |
| 3,101,188 | 8/1963 | Newmiller et al. | 251/241 X |
| 5,360,172 | 11/1994 | Wang | 251/263 X |
| 5,370,316 | 12/1994 | Lancaster . | |

FOREIGN PATENT DOCUMENTS 367727  4/1963  Switzerland ............ 251/263

*Primary Examiner*—Kevin Weldon
*Attorney, Agent, or Firm*—Griffin, Butler, Whisenhunt & Kurtossy

[57] ABSTRACT

A spray head assembly (10) includes a motion transmitter (71) in a spray-head compartment (20) coupled between an actuator shaft (45) and a relatively-rigid valve shaft (100') for transmission of motion from the actuator shaft into axial motion of the valve shaft to thereby move a relatively-resilient poppet member (76'), against liquid flow, away from a valve seat surface (80) when the actuator shaft is moved. The valve shaft which is located in a valve-seat passageway (78) downstream of the poppet member, includes a relatively rigid separate flange (102) thereon extending radially outwardly from the valve shaft. The flange has a bearing face (116) for impinging on a sealing face (114) of the poppet member directed substantially toward the valve seat. The flange fits in a raised ring seal (77') on the sealing face and extends into the valve-seat passageway when the poppet member is seated to be closed. The flange has a tapered outer/upper edge (112).

6 Claims, 2 Drawing Sheets

NOZZLE CONTROL FOR SPRAY HEAD ASSEMBLY

BACKGROUND OF THE INVENTION

This invention relates generally to nozzle controls for spray head assemblies and more particularly to a nozzle control which employs a valve poppet member operated by a shaft positioned in a downstream flow channel of the poppet member so as to move the poppet member against fluid flow when turning on fluid flow.

U.S. Pat. No. 5,370,316 to Lancaster describes a spring-biased actuator lever arm of a spray head assembly having an actuator shaft which extends into a sealed spray-head compartment for sliding a cam to move a cam follower and thereby open a poppet valve positioned inside a water supply passageway against water flow. Although the spray head assembly described in U.S. Pat. No. 5,370,316 to Lancaster has many benefits and has proven to be quite effective, it also has some problems. In this regard, a poppet member of the poppet valve is constructed of a relatively resilient material having a durometer reading of around 89 (durometer hardness) whereas a follower shaft, or a valve shaft, which extends from the cam in the sealed spray-head compartment to the poppet member is of a relatively hard plastic, acetal, having a durometer reading of more than 100. The cam-follower shaft, or valve shaft, moves axially and is embedded in the poppet member. However, fluid pressure tries to keep a sealing face of the poppet member pressed against its seat, thereby resisting the axial motion of the valve shaft. When the poppet member is heated, by hot water, for example, its resiliency increases. It has been found, therefore, that the poppet member does not always immediately unseat with axial movement of the valve shaft. Usually, the poppet member eventually does separate from the valve seat but when it does, it does so suddenly, which is also detrimental. In this regard, this sudden and uncontrolled release of the poppet member from the valve seat makes it impossible for an operator to know exactly when the spray head assembly will squirt water. Also, the operator is prevented from controlling the amount of water sprayed. Thus, for example, if the operator merely wants to fill a glass, he may not be able to do this because the stream of spraying water will be too strong. Instead, he will splash water on himself and the surrounding area.

A related problem with the spray head assembly described in U.S. Pat. No. 5,370,316 to Lancaster is that such continual flexing of the poppet member weakens the poppet member and thereby reduces its life span.

Yet another related problem is that the nature of the cam linkage described for operating the spray head assembly in U.S. Pat. No. 5,370,316 to Lancaster only can cause so much movement of the valve shaft. Thus, in some spray head assemblies, where the poppet member has become too soft, operators have not been able to open the valves, or poppet members, at all. That is, the cam moves, the cam follower moves, the valve shaft moves, and the far end of the poppet member moves; however, the poppet itself flexes so that its sealing face remains seated at all time and the valve never opens.

Still another related problem with the spray head assembly of U.S. Pat. No. 5,370,316 to Lancaster is that, because of the above listed problems, the poppet member cannot be made to have a durometer reading of less than around 80. However, a poppet member with such a high durometer reading can sometimes not be adequately closed by lower water pressures. In this regard, water pressure is expected to help press the poppet member against the valve seat surface when the poppet member is in a closed position. So that the spray head assembly can be used with lower water pressures, which still sealingly close the poppet member against the valve seat, it is desirable to make the poppet member of a material having a greater resiliency. But because of the reasons listed above one cannot do this without reducing the life of the poppet member and reducing control exercised on flowing water.

Finally, yet another problem with the spray head assembly of U.S. Pat. No. 5,370,316 to Lancaster is that, during fabrication thereof, manufacturers sometimes over-insert the valve stem into the poppet member. In this regard, one fabrication step for this spray head assembly involves placing a water-supply pipe with the poppet member therein on a jig. The valve shaft is then inserted from above through a valve-seat portion, or passageway, into the poppet member. However, it is difficult for the manufacturer to "feel" when he has inserted the valve shaft into the poppet member a correct distance, thus, he sometimes over-inserts it.

It is an object of this invention to provide a spray head assembly of a type in which a poppet member is operated by a valve shaft extending from a spray-head compartment to the poppet member inside a downstream valve-seat passageway which provides a finely-controlled flow of liquid, which does not cause undue distortion of the poppet member thereby reducing its life, which provides positive control of a sealing face of the poppet member, which allows inexpensive and exact manufacture of the poppet member and the valve shaft, which allows use of a poppet member having greater resiliency, and which provides a centering of the valve shaft during operation of the poppet member.

SUMMARY OF THE INVENTION

According to principles of this invention, a spray head assembly includes a motion translator in a spray-head compartment coupled between an actuator shaft and a relatively-rigid valve shaft for transmitting motion from the actuator shaft to axial motion of the valve shaft to thereby move a relatively-resilient poppet member, against liquid flow, away from a valve seat when the actuator shaft is moved. The valve shaft, which is located in a valve-seat passageway downstream of the poppet member, includes a relatively rigid separate flange thereon extending radially outwardly from the valve shaft. The flange has a bearing face for impinging on a sealing face of the poppet member directed substantially toward the valve seat. The flange fits in a raised ring seal on the sealing face and extends into the valve-seat passageway when the poppet member is seated. The flange has a tapered outer/upper edge.

BRIEF DESCRIPTION OF THE DRAWING

The invention is described and explained in more detail below using the embodiments shown in the drawings. The described and drawn features, in other embodiments of the invention, can be used individually or in preferred combinations. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

Figure 1:
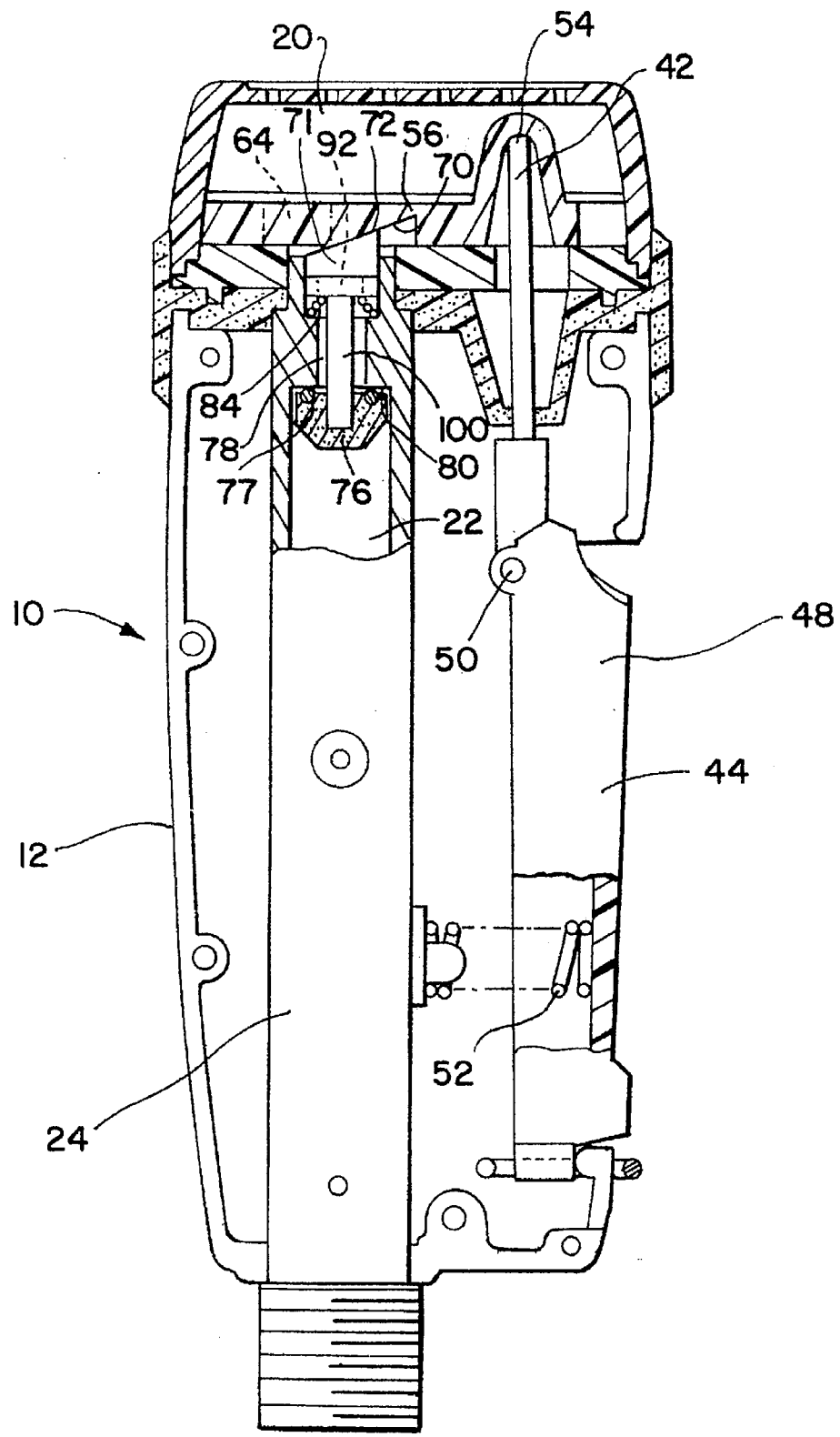
FIG. 1 is a side elevational, partially cutaway, view of a prior art spray head assembly of U.S. Pat. No. 5,370,316 with a housing shell half being removed to expose important elements thereof, with a handle of an actuator lever arm thereof being partially depressed.

Describing first the prior art of U.S. Pat. No. 5,370,316 to Lancaster, as is shown in FIG. 1, (and using the reference numbers used in U.S. Pat. No. 5,370,316) when one wishes to spray with the spray head assembly 10 he encloses a housing shell 12 with his hand, his fingers on a handle 48. He depresses the handle 48 to rotate a lever arm 44 about a pivot 50 so that an outer tip 54 of an actuator shaft 42 moves to the right as seen in FIG. 1 and thereby moves a cam plate 56 in a track. When this happens a bevelled cam surface 70, acting in conjunction with a cam-follower surface 72, causes a cam follower 71 to move downwardly against a bias of a spring 84 and pressure of liquid in a water-supply passageway 22 of a water-supply pipe 24 acting on a poppet member 76 of a poppet valve. This motion is transmitted via a valve shaft 100 which is molded as one piece with the cam follower 71 of a relatively hard resinous plastic, such as acetal. This motion, in turn, lifts an O-ring 77 of the poppet member 76 from a valve-seat surface 80 to thereby allow pressurized water to flow from the water-supply passage 22, through a valve-seat portion, or passageway 78, through holes 92 in the cam follower 71, through holes 64 in the cam plate 56, into a spray-head compartment 20. Once water is supplied, under pressure, to the spray-head compartment 20, it is forced from the spray-head compartment through spray pores 18 so as to be directed towards dinner plates, coffee cups, eating utensils, and the like, to wash them.

When an operator has finished spraying plates, utensils, etc., he removes force from the handle 48. A spring 52 shoves the handle 48 in a counterclockwise direction about the pivot 50, which, in turn, moves the outer tip 54 of the actuator shaft 42 to the left as seen in FIG. 1. This moves the cam plate 56 to the left so that the cam surface 70 is also moved to allow the cam follower 71 to be forced upwardly by the spring 84 and water pressure until the O-ring 77 of the poppet member 76 seats on the valve-seat surface 80. This, force, closes the valve so that water can no longer flow from the water-supply passageway 22 into the spray-head compartment 20. A further description of this prior-art device contained in U.S. Pat. No. 5,370,316 is incorporated by reference herein.

It will be appreciated that when the valve is in a closed position, as depicted in FIG. 1, the poppet member 76, and its O-ring, are forced with a significant amount of pressure against the valve-seat surface 80 by water pressure to thereby produce a strong seal against the valve-seat surface 80. Although it is beneficial that this water pressure provides a positive and strong closing of the poppet member 76, this water pressure also has a detrimental effect in that it tries to keep the valve closed and, therefore, often causes a distortion of the poppet member 76 when the valve shaft 100 moves axially downwardly. That is, with downward axial movement of the valve shaft 100 the poppet member 76 elongates so that its O-ring 77 remains seated against the valve-seat surface 80. Finally, the O-ring 77 snaps away from the valve seat 80 suddenly throwing the valve open and providing a full flow of liquid. As mentioned above, this distortion and sudden operation of the poppet member 76 causes a loss of control, a weakening of the poppet member 76, and a decrease in poppet-member life.

Figure 2:
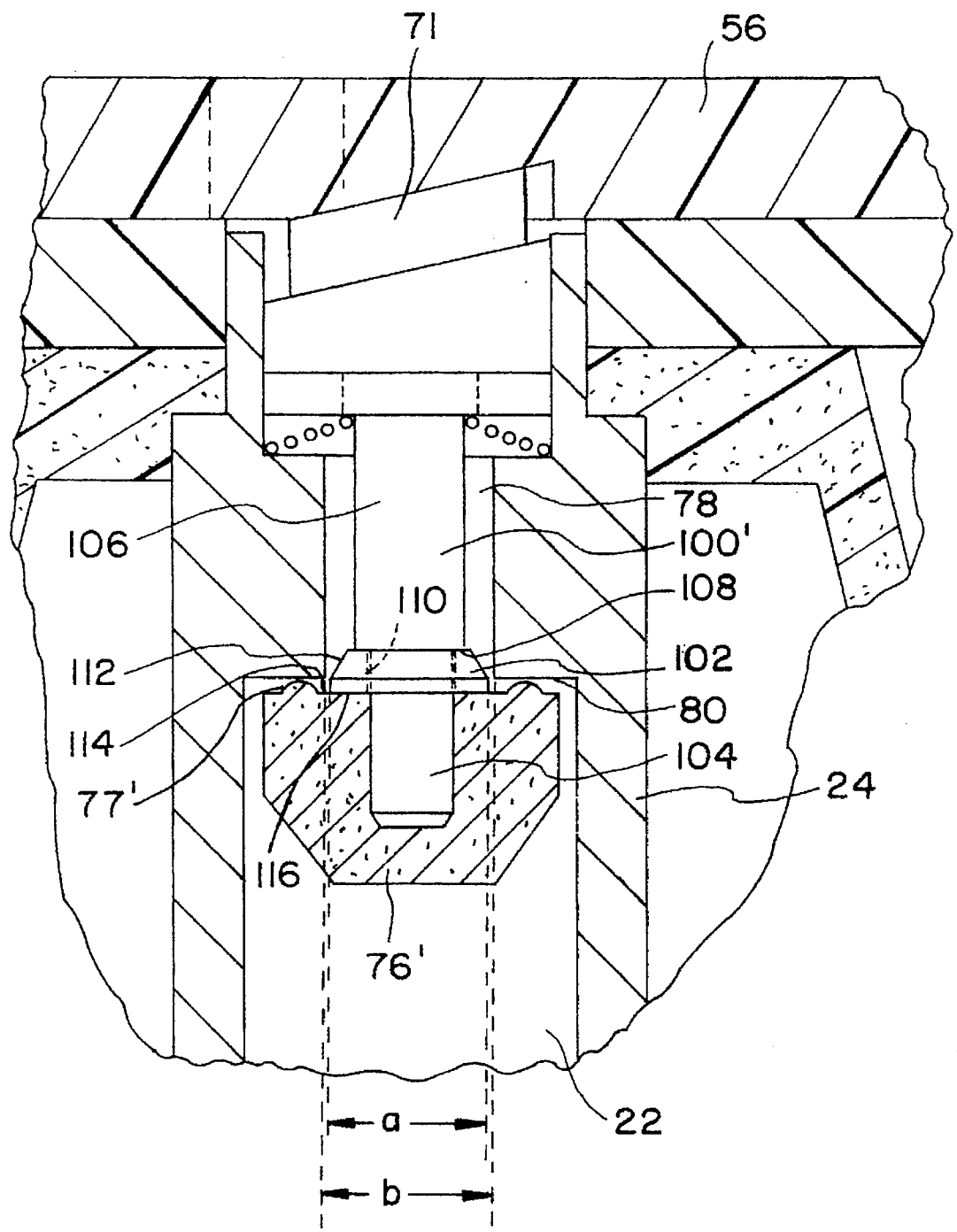
FIG. 2 is an enlarged, segmented, partial cross sectional view of a valve operation portion of a spray head assembly of this invention.

An enlarged segment of valve-operation members of this invention for use with a spray head assembly of the type shown in FIG. 1, as well as with other related assemblies, is depicted in FIG. 2. These valve-operation members can be substituted for corresponding elements in the spray head assembly of FIG. 1. Identical elements are given the same reference numbers in FIG. 2 as in FIG. 1, however, where these elements have been changed they are referred to with a prime (') symbol. Elements which are not referred to in FIG. 1 are given new numbers starting with 102. The poppet member 76' differs only from the poppet member 76 in that the O-ring 77' is molded as one piece with the rest of the elements of the poppet member 76', whereas in FIG. 1 the O-ring 77 is separate from the rest of the poppet member. However, this particular aspect of the structure shown in FIG. 2 is not directly related to this invention. The elements which are different for this invention are the valve shaft 100' which has been reconfigured, and a separate washer flange 102, which has been added. In this regard, the valve shaft 100' has a small diameter portion 104 and a large diameter portion 106, unlike the straight valve shaft 100 of FIG. 1. The small diameter portion 104 has the same diameter as the valve shaft 100 of the prior art device shown in FIG. 1. The large diameter portion 106 has been added mainly to create a shoulder 108 at the interface between the small diameter portion 104 and the large diameter portion 106 The valve shaft 100', the cam follower 71, and intermediate members are molded as one piece of a resinous plastic, with a durometer reading above 100, such as acetal sold under the trademark CELCON by DuPont.

The flange 102 is molded separately and has a washer, or annular, shape with a central opening 110 which fits on the small diameter portion 104 of the valve shaft 100. The flange 102 is molded separately from the valve shaft 100, but of the same material, that is, of acetal resinous plastic with a durometer reading above 100. The flange 102, of course, is round as is its central opening 110 and the valve shaft 100'. A maximum outer diameter "a" of the flange 102 is slightly less than the diameter "b" of the valve-seat passageway 78 so that the flange 102 can fit into the valve-seat passageway 78 as is shown in FIG. 2 when the poppet member 76, with its O-ring 77', is seated on the valve-seat surface 80. Also, as can be seen in FIG. 2, the outer/upper edge of the flange 102 is tapered at 112. Also, it should be noted that the maximum diameter of the flange 102, which is at the bottom of the flange when it is mounted on the small diameter portion 104, is nested inside of the O-ring 77'.

The cam follower 71 and its integral valve shaft 100', along with the poppet member 76', are mounted at the valve-seat passageway 78 as follows:

The poppet member 76' is placed into the water-supply passageway 22 of the water supply pipe 24 from the bottom thereof as seen in FIG. 2 with the separate flange 102 resting on a sealing face 114 thereof inside the O-ring 77'. The poppet member 76' is held seated against the valve-seat surface 80 by a jig. Thereafter, the valve shaft 100' of the cam follower 71 is inserted from above through the valve-seat passageway 78. The small diameter portion 104 of the valve shaft 100' is inserted through the central opening 110 in the flange 102 and into the poppet member 76'. Eventually, a resistance is met when the shoulder 108 of the valve shaft 100' impinges on an upper surface of the flange 102 and a bearing face 116 of the flange 102 makes solid contact with the sealing face 114 of the poppet member 76'. At this point a fabricator can "feel" that the small diameter portion 104 has been inserted far enough into the poppet member 76' and ceases trying to insert it further.

In operation, the valve control apparatus depicted in FIG. 2 operates exactly like the prior art device shown in FIG. 1 except that its operation is vastly improved. It is, for example, beneficial that when the cam plate 56 moves to the right, thereby driving the cam follower 71 and the attached valve shaft 100' downwardly, the relatively large bearing face 116 of the flange 102 bears directly on the sealing face 114 (the face directed toward the valve-seat surface) of the poppet member 76' because in this manner it positively controls the sealing face 114 to ensure that the O-ring 77' immediately moves away from the valve-seat surface 80.

Further, the fact that the flange 102 almost quadruples the surface area bearing on the poppet member 76', that is the surface area acting to move the poppet member 76' downwardly, reduces distortion of the poppet member 76' so that, again, there is positive control over the O-ring 77' and the life of the poppet member 76' is increased. Similarly, the fact that the bearing surfaces acting on the poppet member 76' are applied both at the top of the poppet member 76' and at a lower point on the poppet member 76' (the end of the small diameter portion 104) also prevents distortion of the poppet member 76'.

It is also beneficial that the maximum diameter "a" of the flange 102 fits into the valve-seat passageway 78 because this ensures that the flange 102 is free to move upwardly and does not prevent a good seal between the O-ring 77' and the valve-seat surface 80. Yet another benefit from this structure, with the flange 102 extending into the valve-seat passageway 78, is that it helps to gradually control flow of fluid from the water-supply passageway 22 into the valve-seat passageway 78. Similarly, the tapered outer/upper edge of the flange 102 also contributes to a gradual regulation of water flow as the valve is opened. Thus, with the valve mechanism depicted in FIG. 2, an operator of a spray head assembly can fill glasses or cups without unduly splashing water about the surroundings. However, if he so desires, the operator can also cause a substantial water flow for blasting material from plates. By depressing the handle 48 a great deal, thereby moving the cam plate 76 a substantial amount and driving the flange 102 downwardly until its upper face clears, or almost clears, the valve-seat surface 80, large flows can be created. At the upper surface of the flange the diameter of the flange has become quite small because of the taper 112.

Regarding the taper 112, this also ensures that the valve shaft 100 properly centers on the valve-seat passageway 78 as the poppet member 76' moves toward a closed position.

Still another benefit of this invention is that, because of the increased bearing area acting on the poppet member 76', the poppet member 76' can be constructed of a more resilient material so that it can be held closed by lower water pressures. Even when the poppet member 76' is produced to have a lower durometer reading (less than 80) it still does not deform as much as the poppet member in the prior art assembly of FIG. 1 and it still has a longer life than the poppet member of the prior art assembly. Tests have shown that with the structure of this invention the durometer reading of the poppet member can be around 45 rather than the 89 durometer reading of the poppet member in the prior-art system. Such a low-durometer poppet member provides an extremely good seal.

It is also extremely beneficial that the valve shaft 100' and the flange 102 are molded separately and that both of these members are constructed of molded resinous plastic. Although it would be possible to mold the flange 102 as one piece with the valve shaft 100' and the cam follower 71 it has been found extremely beneficial to mold these members as separate parts. In this regard, molding these members as separate parts actually reduces labor and costs because when they are molded as one part a much more complicated mold is required and additional cleaning steps are required.

While the invention has been particularly shown and described with reference to a preferred embodiment, it will be understood by those of ordinary skill in the art that various changes in form and detail may be made therein without departing from the spirit and scope of the invention.

For example, although the valve apparatus depicted in FIG. 2 has been described when used in a prior art device like that shown in FIG. 1, it could be used with other valve apparatus where poppet members are operated by shafts positioned in the fluid-flow passageways downstream of the poppet members to operate the poppet members against fluid flow for opening them.

The invention claimed is:

1. A spray head assembly comprising a housing shell, a movable actuator arm including a handle and an actuator shaft, said housing shell defining a spray-head compartment into which said actuator shaft of said actuator arm extends and from which liquid is sprayed through at least one spray-nozzle pore, and a liquid-supply pipe defining a liquid-supply passageway leading into said spray-head compartment, wherein the assembly further includes:

a resilient poppet member positioned inside said liquid-supply passageway for being moved away from a valve seat having a valve-seat passageway therethrough for allowing flow of water from said water-supply passageway into said spray-head compartment, said poppet member being driven closed by liquid flow toward said spray-head compartment;

a rigid valve shaft extending from said spray-head compartment through said valve-seat passageway to said poppet member for moving said poppet member away from said valve seat against liquid flow in said liquid-supply passageway;

a mechanical movement transmitter coupled between said actuator shaft and said valve shaft for transmitting motion from said actuator shaft into axial motion of said valve shaft to thereby move said poppet member away from said valve seat when said handle of said actuator arm is moved;

wherein is further included a relatively-rigid, annularly-shaped, separate flange, mounted on said valve shaft extending radially outwardly from said valve shaft, said flange having a bearing face for impinging on a sealing face of said poppet member directed substantially toward said valve seat and having a maximum outer diameter which is only slightly smaller than an inner diameter of said valve-seat passageway whereby said separate flange almost completely fills said valve-seat passageway so as to significantly impede a flow of liquid through said valve-seat passableway;

wherein said valve shaft has at least two different diameter portions so as to form a shoulder at a transition between a larger diameter portion and a smaller diameter portion, said separate flange having a central opening which is large enough for receiving said smaller diameter portion but which is not large enough for receiving said larger diameter portion so that said separate flange impinges against said shoulder, said valve poppet having a hole therein for receiving an end of said smaller diameter portion for holding the valve poppet on said smaller diameter portion of said valve shaft and impinging on said flange to hold said flange on said valve shaft.

2. A spray head assembly as in claim 1 wherein said sealing face of said valve poppet has an integral (formed as one piece with said valve poppet) raised ring seal thereon whose inner diatemeter is only slightly greater than a maximum outer diameter of said flange and an inner diameter of said valve-seat passageway and wherein said flange is therefore nested in said ring seal.

3. A spray head assembly as in claim 1 wherein a maximum outer diameter of said flange is such that said flange fits closely into the valve-seat passageway through which said valve shaft extends when said poppet member is seated in a closed position.

4. A spray head assembly as in claim 3 wherein said flange has a tapered outer/upper edge directed away from said sealing face for cooperating with an edge of said valve seat at an end of said valve-seat passageway for gradually controlling flow of liquid through said valve-seat passageway in response to said flange being moved into and out of said valve-seat passageway as said resilient poppet is closed onto, and moved away from, said valve seat.

5. A spray head assembly as in claim 1 wherein the durometer reading of the shaft is 100 or greater and the durometer reading of the poppet member is less than 89.

6. A spray head assembly as in claim 5 wherein the durometer reading of the poppet member is below 80.

* * * * *